(12) United States Patent
Wentink (10) Patent No.: US 8,924,807 B2
(45) Date of Patent: Dec. 30, 2014

(54) METHOD AND APPARATUS FOR ACKNOWLEDGEMENT USING A GROUP IDENTIFIER

(75) Inventor: Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/338,764

(22) Filed: Dec. 28, 2011

(65) Prior Publication Data

US 2013/0172035 A1 Jul. 4, 2013

(51) Int. Cl.
*H04L 1/18* (2006.01)
*H04L 1/16* (2006.01)
*H04L 5/00* (2006.01)

(52) U.S. Cl.
CPC ............ *H04L 1/1621* (2013.01); *H04L 5/0055* (2013.01)
USPC ........................................................ 714/748

(58) Field of Classification Search
CPC ... H04L 1/1816; H04L 1/1809; H04L 1/1621; H04L 5/0055
USPC ...................... 714/18, 748–749; 370/312, 328
See application file for complete search history.

(56) References Cited

U.S. PATENT DOCUMENTS

| | | | |
|---|---|---|---|
| 6,710,702 B1 * | 3/2004 | Averbuch et al. | 340/7.1 |
| 8,116,249 B2 * | 2/2012 | Shiba et al. | 370/312 |
| 2011/0261742 A1 | 10/2011 | Wentink | |

OTHER PUBLICATIONS

International Search Report and Written Opinion—PCT/US2012/070712—ISA/EPO—Mar. 20, 2013 (101751WO).

\* cited by examiner

*Primary Examiner* — Shelly A Chase
(74) *Attorney, Agent, or Firm* — Charles E. Eggers (57) ABSTRACT

Systems, methods, and devices for performing acknowledgment signaling using a group identifier are described herein. In some aspects, a device receives information identifying a plurality of wireless communication devices, such as a group identifier. Upon determining that the device is identified by the information, the device transmits an acknowledgment of whether data transmitted to the device was correctly received.

48 Claims, 8 Drawing Sheets

METHOD AND APPARATUS FOR ACKNOWLEDGEMENT USING A GROUP IDENTIFIER

BACKGROUND

1. Field

The present application relates generally to wireless communications, and more specifically to systems, methods, and devices for acknowledgement of received data using a group identifier

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may communicate information between each other. As part of communicating, it may be desirable for the transmitter of data to receive confirmation that the transmitted data has been received by the intended recipient. Thus, the receiver of the data may transmit an acknowledgment signal indicating whether or not the data was correctly received. If the acknowledgment signal indicates that the data was not correctly received, the transmitter may retransmit the data to the receiver. If the data is, again, not correctly received, the transmitter may initiate a process to improve the channel, such as estimating the channel, estimating optimal beamforming vectors, or changing the channel frequency. Acknowledgment signals contribute to transmission overhead and it is desirable to reduce the length of time used for acknowledgment transmissions, particularly in a multi-user scenario in which data is sent to multiple devices and multiple acknowledgment signals must be received.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved acknowledgment signaling using a group identifier.

One aspect of the disclosure provides a method of transmitting an acknowledgment of received data. The method comprises receiving, at a device, information identifying a plurality of wireless communication devices. The method further comprises determining that the device is one of the identified plurality of wireless communication devices. The method further comprises transmitting, at the device, based on the determining, an acknowledgment of whether data transmitted to the device was correctly received.

Another aspect of the disclosure provides a method of receiving acknowledgment of transmitted data. The method comprises transmitting, to each of a plurality of wireless communication devices, information identifying a subset of the plurality of wireless communication devices. The method further comprises transmitting data to each of the subset of the plurality of wireless communication devices. At least a portion of the data transmitted to a first wireless communication device of the subset is transmitted concurrently with at least a portion of the data transmitted to a second wireless communication device of the subset. The method further comprises receiving, from each of the subset of the plurality of wireless communication devices, an acknowledgment of the data transmitted to that wireless communication device.

Another aspect of the disclosure provides an apparatus for transmitting an acknowledgment of received data. The apparatus comprises a receiver configured to receive information identifying a plurality of wireless communication devices. The apparatus further comprises a processor configured to determine that the apparatus is one of the identified plurality of wireless communication devices. The apparatus further comprises a transmitter configured to transmit, based on the determining, an acknowledgment of whether data transmitted to the apparatus was correctly received.

Another aspect of the disclosure provides an apparatus for receiving acknowledgment of transmitted data. The apparatus comprises a transmitter configured to transmit, to each of a plurality of wireless communication devices, information identifying a subset of the plurality of wireless communication devices. The transmitter is configured to transmit data to each of the subset of the plurality of wireless communication devices. At least a portion of the data transmitted to a first wireless communication device of the subset is transmitted concurrently with at least a portion of the data transmitted to a second wireless communication device of the subset. The apparatus comprises a receiver configured to receive, from each of the subset of the plurality of wireless communication devices, an acknowledgment of the data transmitted to that wireless communication device.

Another aspect of the disclosure provides an apparatus for transmitting an acknowledgment of received data. The apparatus comprises means for receiving information identifying a plurality of wireless communication devices. The apparatus further comprises means for determining that the apparatus is one of the identified plurality of wireless communication devices. The apparatus further comprises means for transmitting, based on the determining, an acknowledgment of whether data transmitted to the apparatus was correctly received.

Another aspect of the disclosure provides an apparatus for receiving acknowledgment of transmitted data. The apparatus comprises means for transmitting, to each of a plurality of wireless communication devices, information identifying a subset of the plurality of wireless communication devices. The apparatus further comprises means for transmitting data to each of the subset of the plurality of wireless communication devices. At least a portion of the data transmitted to a first wireless communication device of the subset is transmitted concurrently with at least a portion of the data transmitted to a second wireless communication device of the subset. The apparatus further comprises means for receiving, from each of the subset of the plurality of wireless communication devices, an acknowledgment of the data transmitted to that wireless communication device.

Another aspect of the disclosure provides a computer readable medium comprising instructions. The instructions when executed cause an apparatus to receive information identifying a plurality of wireless communication devices. The instructions when executed cause the apparatus to determine that the apparatus is one of the identified plurality of wireless communication devices. The instructions when executed cause the apparatus to transmit, based on the determining, an acknowledgment of whether data transmitted to the apparatus was correctly received.

Another aspect of the disclosure provides a computer readable medium comprising instructions. The instructions when executed cause an apparatus to transmit, to each of a plurality of wireless communication devices, information identifying a subset of the plurality of wireless communication devices. The instructions when executed cause an apparatus to transmit data to each of the subset of the plurality of wireless communication devices. At least a portion of the data transmitted to a first wireless communication device of the subset is transmitted concurrently with at least a portion of the data transmitted to a second wireless communication device of the subset. The instructions when executed cause an apparatus to receive, from each of the subset of the plurality of wireless communication devices, an acknowledgment of the data transmitted to that wireless communication device.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol, as an example, using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
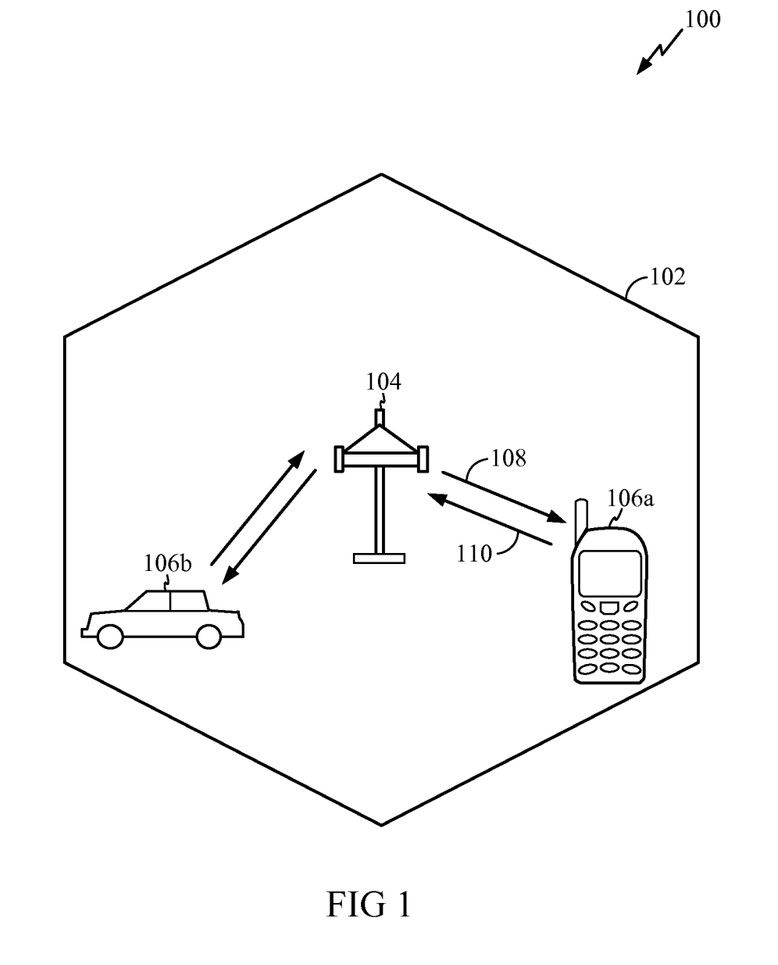
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. Further, the functions of the STAs 106 described herein may alternatively be performed by one or more of the APs 104.

Figure 2:
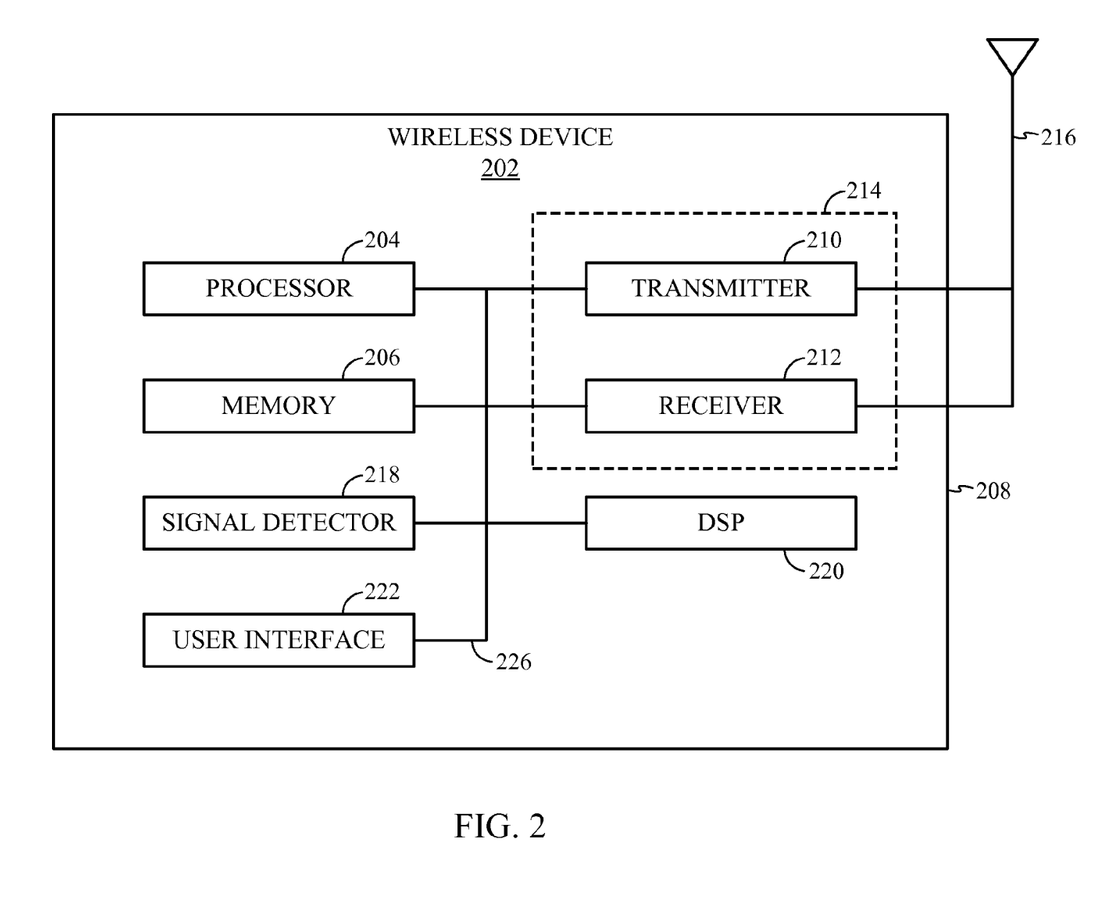
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to generate data, process data, and control operation of the wireless device 202, as discussed in further detail below.

When the wireless device 202 is implemented or used as a receiving node, the processor 204 may be configured to generate data, process data, and control operation of the wireless device 202, as discussed in further detail below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. The transmitter 210 may be configured to wirelessly transmit data. The receiver 212 may be configured to receive data.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive data.

Described herein are systems and methods for transmitting and receiving an acknowledgment signal using a group identifier.

Figure 3:
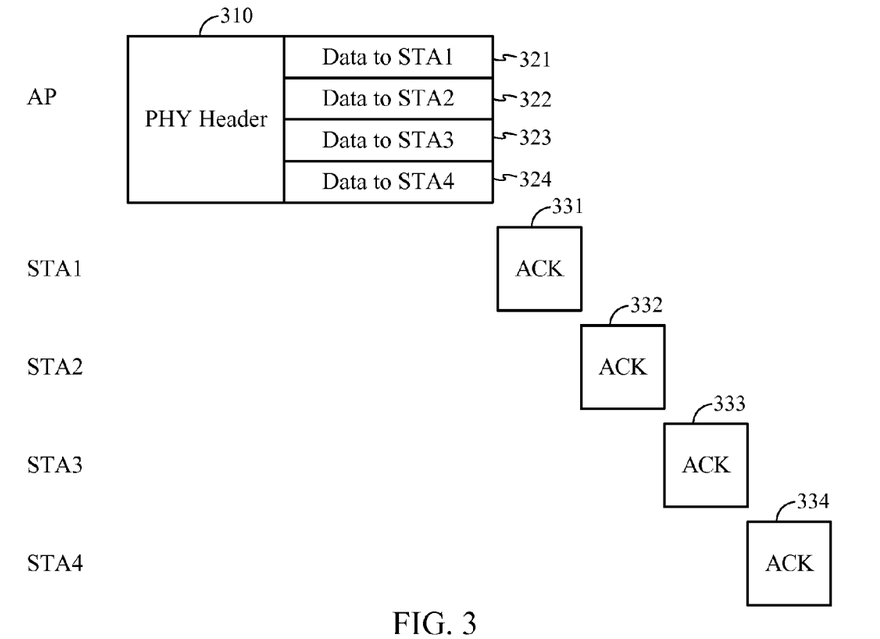
FIG. 3 illustrates an example of the signaling that may occur for acknowledging receipt of data from a wireless device using a sequential acknowledgment scheme.

FIG. 3 illustrates an example of the signaling that may occur for acknowledging receipt of data from a wireless device using a sequential acknowledgment scheme. The signaling begins with the transmission by the access point (AP) of a PHY header 310. The PHY header 310 may be a broadcast transmission at the beginning of a transmission frame. The broadcast transmission may be received by all the stations associated with the AP as well as by stations not associated with the AP. The PHY header 310 may be transmitted at a data rate which is capable of being received by all of the stations associated with the AP. This data rate may be lower than that of at least some of the subsequently transmitted data 321, 322, 323, and 324. The PHY header 310 may be transmitted using a data modulation which is capable of being received by all of the stations associated with the AP, e.g., BPSK. This modulation may be simpler than that of at least some of the subsequently transmitted data 321, 322, 323, and 324, e.g., QPSK, 16-QAM, etc. The PHY header 310 may include information regarding the AP or the network of which the AP is a part. The PHY header 310 may include information regarding subsequently transmitted data 321, 322, 323, and 324, such as the length of a data transmission period. As described in detail below, the PHY header may also include data about the intended recipients of subsequently transmitted data 321, 322, 323, and 324 in the form of a group identifier (Group ID).

The PHY header 310 is followed by transmission by the AP of data to a first station (STAT) 321, data to a third station (STA3) 323, and data to a fourth station (STA4) 324. Notably, the AP may or may not transmit data to a second station (STA2) 322 during this frame. The transmitted data may be transmitted simultaneously or concurrently, at least in part. To achieve this, the data transmissions 321, 322, 323, and 324 may be beamformed or otherwise spatially directed to their respective stations. In another embodiment, the data transmissions 321, 322, 323, and 324 are transmitted at different frequencies or at different times.

Once data has been transmitted, it is beneficial for the AP to know whether the data has been detected and properly decoded. Data may be considered correctly received if a cyclic redundancy check (CRC) or other parity bit or sequence indicates correct reception. If the data has not been correctly received, the AP may retransmit the data in a later transmission. If the data is, again, not correctly received, the AP may initiate a process to improve the channel, such as estimating the channel, estimating optimal beamforming vectors, or changing the channel frequency.

Thus, the signaling continues with a sequential acknowledgment (ACK) sequence in which each station transmits an ACK signal back to the AP. The ACK signal indicates whether or not the station has detected and properly decoded transmitted data. The ACK signal may be a single bit which indicates whether or not the data was correctly received. Alternatively, as described in detail below, the ACK signal may be a Block ACK with many bits which indicate whether respective subsections of the transmitted data were correctly received.

The sequential ACK sequence includes an ACK signal from each of the stations, including an ACK signal from STA2 332 even though no data was received at STA2. Each station transmits its respective ACK signal at a predetermined time such that ACK signals are not transmitted simultaneously. The predetermined time may be assigned by the AP or determined by each station based on an order. The order may be, e.g., the order in which the stations associated with the AP. Thus, based on this understanding but without coordination between the stations, the ACK from STA1 331 is immediately followed by ACK from STA2 332 which is immediately followed by the ACK from STA3 333 which is immediately followed by the ACK from STA4 334.

If all transmitted data is correctly received, the ACK signals would indicate that STA1 correctly received data, STA2 did not correctly receive data, STA3 correctly received data, and STA4 correctly received data. Notably, the ACK signal from STA2 332 indicates that STA2 did not correctly receive data. However, this may be expected if no data was transmitted to STA2. Thus, the ACK signal from STA2 332, which is transmitted to the AP, may include no information the AP did not already know. Such redundant transmissions reduce the occurrence of interrupted sequential acknowledgement sequences. Accordingly, in one embodiment, an ACK signal is only transmitted by a STA at which data is detected. Thus, the ACK signal indicates whether received data has been properly decoded. This does not result in a similar ambiguity at the AP because the AP knows whether data was transmitted to a particular station. Accordingly, if the AP receives a positive ACK from a station, it can determine that the data was correctly received. If the AP receives a negative ACK from a station, it can determine that the data was received, but not properly decoded. If the AP receives no ACK from a station, it can determine that the data was not received.

If the AP repeatedly receives no ACK from a station, it may determine that there is an issue with the uplink channel and may initiate a procedure for improving the uplink channel, such as estimating the uplink channel, estimating optimal uplink beamforming vectors, or changing the frequency of the uplink channel. If the AP repeatedly receives a negative ACK from a station, it may determine that there is no issue with the uplink channel. However, it may determine that there is an issue with the downlink channel and may initiate a process to improve the downlink channel, such as estimating the downlink channel, estimating optimal downlink beamforming vectors, or changing the frequency of the downlink channel.

Figure 4:
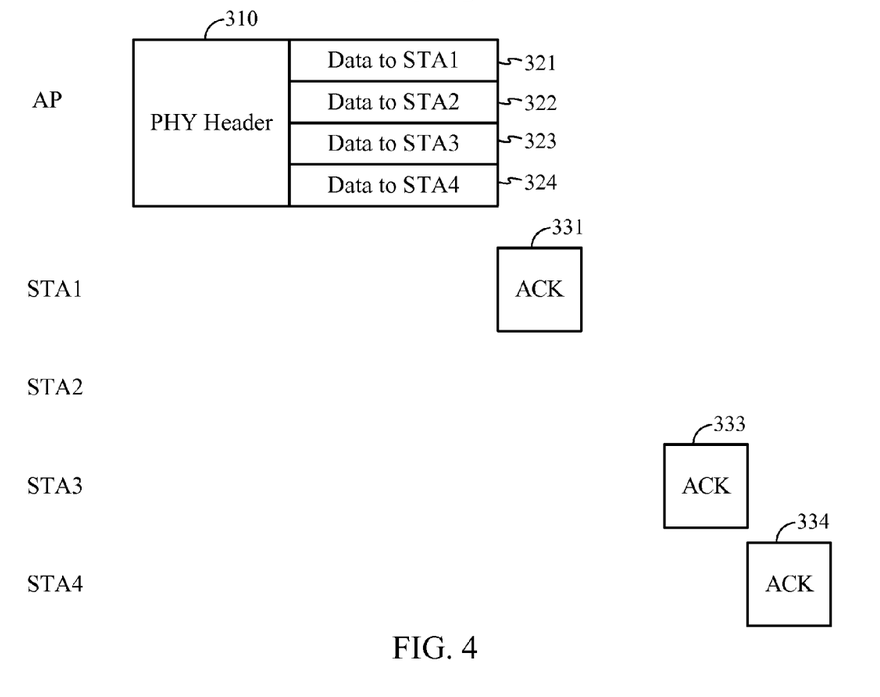
FIG. 4 illustrates another example of the signaling that may occur for acknowledging receipt of data from a wireless device using a sequential acknowledgment scheme.

FIG. 4 illustrates another example of the signaling that may occur for acknowledging receipt of data from a wireless device using a sequential acknowledgment scheme. The signaling of FIG. 4 begins, as in FIG. 3, with the transmission by the access point (AP) of a PHY header 310. As noted above, the PHY header 310 may be a broadcast transmission at the beginning of a transmission frame. The PHY header 310 is followed by transmission by the AP of data to a first station (STAT) 321, data to a third station (STA3) 323, and data to a fourth station (STA4) 324. As in FIG. 3, the AP may or may not transmit data to a second station (STA2) 322 during this frame.

The signaling continues with a sequential acknowledgment (ACK) sequence in which each station which detects a transmission of data to that station transmits an ACK signal back to the AP. The ACK signal indicates whether or not the station has properly decoded the transmitted data. The ACK signal may be a single bit which indicates whether or not the data was properly decoded. Alternatively, the ACK signal may be a Block ACK with many bits which indicate whether respective subsections of the transmitted data were correctly received.

The sequential ACK sequence includes an ACK signal from STA1, STA3, and STA4. Notably, STA2 does not transmit an ACK signal in the example of FIG. 4. Nevertheless, a time is provided between the ACK from STA1 331 and the ACK from STA3 333 for such a transmission. This temporal gap results from the determination by each station of when it should transmit its respective ACK signal. Neither STA3 nor STA4 know, a priori, whether STA2 will detect data and send an ACK signal. Accordingly, both STA3 and STA4 leave a temporal gap for an ACK signal from STA2.

As discussed above, the redundant transmission of an ACK by STA2 332 in FIG. 3 results from an ambiguity at STA2 as to whether STA2 was not transmitted data or whether STA2 was transmitted data which was not detected. This ambiguity can be eliminated by transmitting additional information regarding which stations will be transmitted data. In one embodiment, information regarding which stations will receive data is broadcast as part of the PHY header 310.

Figure 5:
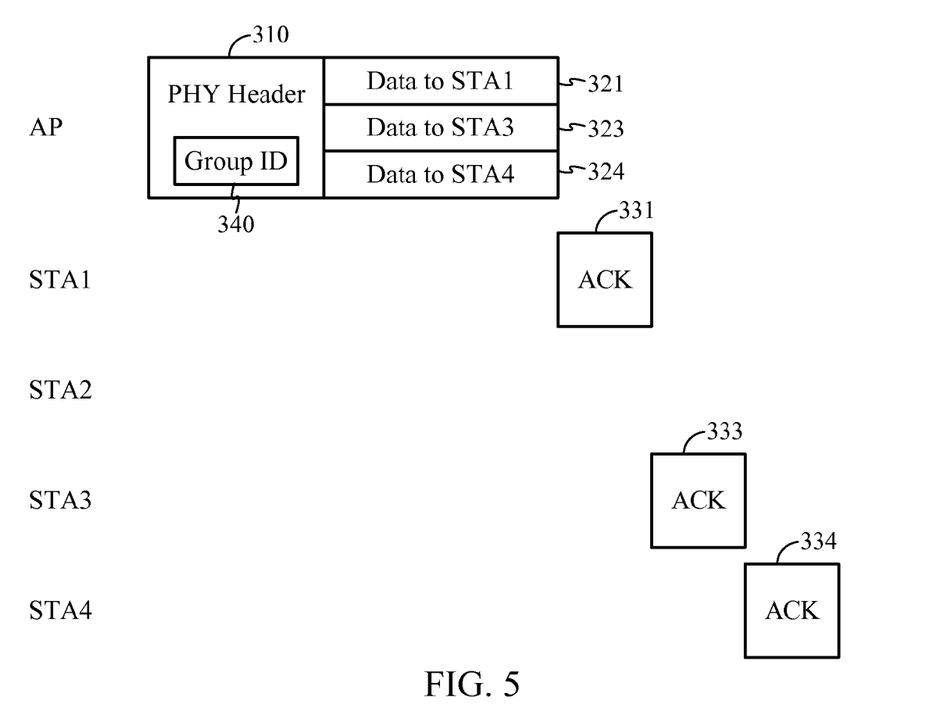
FIG. 5 illustrates an example of the signaling that may occur for acknowledging receipt of data from a wireless device using an acknowledgment scheme including a group identifier.

FIG. 5 illustrates an example of the signaling that may occur for acknowledging receipt of data from a wireless device using an acknowledgment scheme including a group identifier. The signaling of FIG. 5 begins, as in FIG. 3, with the broadcast transmission by the access point (AP) of a PHY header 310. The PHY header 310 includes a group identifier (Group ID) 340 which identifies which of the stations associated with the AP will be transmitted data. In some embodiments, the Group ID 340 identifies a subset of the stations associated with the AP. In the particular example illustrated in FIG. 5, the Group ID 340 identifies STA1, STA3, and STA4 but does not identify STA2. Thus, all associated stations know, a priori, which stations will receive data and which stations will transmit an ACK signal. Whereas, in the scheme described with respect to FIG. 4, both STA3 and STA4 leave a temporal gap for an ACK signal from STA2, they need not do so in the scheme described with respect to FIG. 5, because the Group ID informs them that STA2 will not be sending an ACK signal.

The Group ID, sometime abbreviated GID, may be defined by the AP in a previous transmission and stored in a table in a memory of each of the stations. In one embodiment, the AP defines a Group ID for every possible combination of stations associated with the AP. Thus, the Group ID includes at least N bits, wherein N is number of stations associated with the AP. In other embodiments, the AP defines Groups IDs on an as-needed or ad hoc basis. Thus, the AP may define a first Group ID to include devices to which data is often transmitted and a second Group ID to further include devices to which data is rarely transmitted. Thus, only two Group IDs are needed and the Group ID may be only one bit. In some embodiments, the Group ID may identify stations to which data is not transmitted (disadvantageously resulting in redundant ACK signals from those devices) in order to advantageously reduce the average length of Group IDs.

The PHY header 310 is followed by transmission by the AP of data to a first station (STA1) 321, data to a third station (STA3) 323, and data to a fourth station (STA4) 324. As in FIG. 3, the AP does not transmit data to a second station (STA2) during this frame.

The signaling continues with a sequential acknowledgment (ACK) sequence in which each station identified by the Group ID transmits an ACK signal back to the AP. The ACK signal indicates whether or not the station has detected and properly decoded transmitted data. The ACK signal may be a single bit which indicates whether or not the data was correctly received. Alternatively, as described in detail below, the ACK signal may be a Block ACK with many bits which indicate whether respective subsections of the transmitted data were correctly received.

The sequential ACK sequence includes an ACK signal from each of the stations identified by the Group ID and each station transmits its respective ACK signal at a predetermined time such that ACK signals are not transmitted simultaneously. The predetermined time may be assigned by the AP or determined by each station based on an order and based on which stations are identified in the Group ID. The order may be, e.g., the order in which the stations associated with the AP. Thus, based on this understanding but without coordination between the stations, the ACK from STA1 331 is immediately followed by ACK from STA3 333 which is immediately followed by the ACK from STA4 334.

Advantageously, STA2 does not transmit an ACK signal because it is not identified by the Group ID, thereby saving power at both STA2 and the AP. Further, because STA3 and STA4 are informed (by the broadcast Group ID) that STA2 will not send an ACK, no temporal gaps exist in the ACK sequence, thereby increasing the bandwidth efficiency. There is small trade-off in bandwidth efficiency in that additional bandwidth is required to transmit the Group ID. Accordingly, in some embodiments, the AP can dynamically configure the network into one of the schemes described above with respect to FIGS. 3-5.

Figure 6:
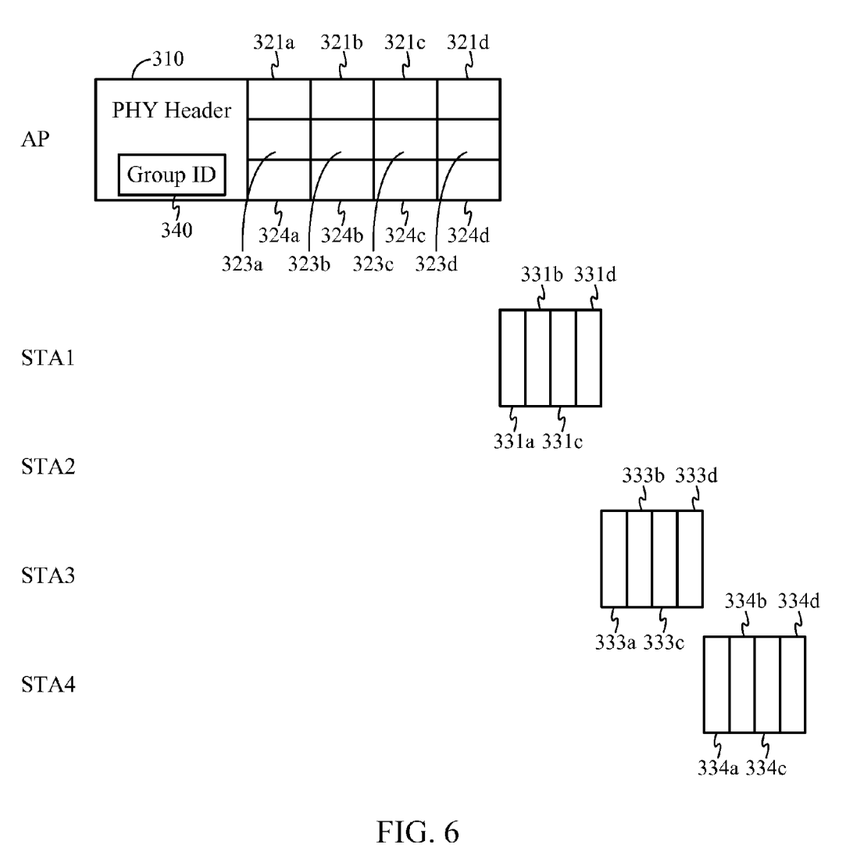
FIG. 6 illustrates an example of the signaling that may occur for acknowledging receipt of data from a wireless device using a block acknowledgment scheme including a group identifier.

FIG. 6 illustrates an example of the signaling that may occur for acknowledging receipt of data from a wireless device using a block acknowledgment scheme including a group identifier. The signaling of FIG. 6 begins, as in FIG. 3, with the broadcast transmission by the access point (AP) of a PHY header 310. The PHY header 310 includes a group identifier (Group ID) 340 which identifies which of the stations associated with the AP will be transmitted data. In some embodiments, the Group ID 340 identifies a subset of the stations associated with the AP. In the particular example illustrated in FIG. 6, the Group ID 340 identifies STA1, STA3, and STA4 but does not identify STA2.

The PHY header 310 is followed by transmission by the AP of data to a first station (STA1) 321, data to a third station (STA3) 323, and data to a fourth station (STA4) 324. As in FIG. 3, the AP does not transmit data to a second station (STA2) during this frame. Each data transmission 321, 323, and 324 is partitioned into a plurality of subunits 321a-d, 323a-d, and 323a-d.

The signaling continues with a sequential acknowledgment (ACK) sequence in which each station identified by the Group ID transmits a block ACK signal back to the AP. Each block ACK signal 331, 333, and 334 is similarly partitioned into a plurality of ACK signal subunits 331a-d, 333a-d, and 334a-d. Each ACK signal subunit indicates whether or not the station has detected and properly decoded the respective data subunit.

As described above, when the AP receives a negative ACK, an indication that data was not properly decoded, the AP may retransmit the data in a later transmission. By partitioning the data transmissions and the ACK signals, the AP may receive an ACK which indicates that three data subunits were properly decoded, but one was not. Thus, the AP may retransmit only the data subunit which was not properly decoded and need not retransmit the data subunits which were properly decoded.

The use of block ACK signals decreases the amount of retransmitted data which was previously properly decoded, thereby increasing bandwidth efficiency. However, the use of block ACK signals may increase the length of the sequential ACK sequence, thereby reducing bandwidth efficiency. Accordingly, the AP may dynamically configure the network into a non-block ACK mode and a block ACK mode. The AP may decide which mode to use based on an expected or measured error metric or a signal-to-noise ratio (SNR) or signal-to-interference-plus-noise ratio (SINR) of the channel. As more errors are expected, the block ACK mode becomes more bandwidth efficient and as less errors are expected, the non-block ACK mode becomes more bandwidth efficient.

Figure 7:
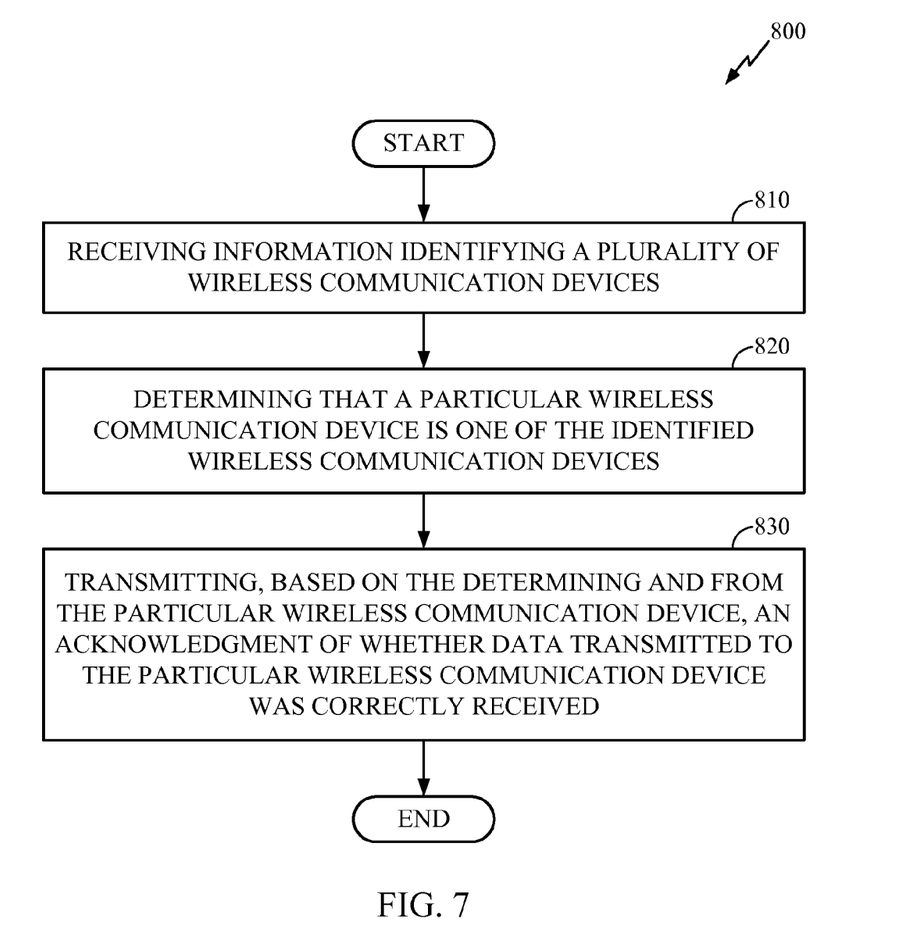
FIG. 7 illustrates an aspect of a method for transmitting an acknowledgment of data in a wireless network.

FIG. 7 illustrates an aspect of a method for transmitting an acknowledgment of data in a wireless network. The method 800 begins in block 810 with the reception of information identifying a plurality of wireless communication devices. The information may be received by a wireless communication device via at least one of an antenna, a network interface, a modem, or a receiver. The information may be received as part of a PHY header. The wireless communication device that receives the information may be a station associated with an AP, and the information may be transmitted by the AP. Accordingly, the information identifying a plurality of wireless communication devices may correspond to information identifying a subset of the stations associated with the AP. The information identifying a plurality of wireless communication devices may include a group identifier (Group ID).

The method 800 continues to block 820 where the wireless communication device determines if it is one of the identified wireless communication devices. The determination may be performed, for example, by the wireless communication device using at least one of a processor and a memory. The memory may store a table of Group IDs which identify the wireless communication device. The memory may store a table of Group IDs and each of the wireless communication devices identified by each Group ID.

If the wireless communication device is one of the identified wireless communication devices, the method 800 continues to block 830 where the wireless communication device transmits an acknowledgment of whether data transmitted to the wireless communication device was correctly received. The transmission may be performed, for example, by the wireless communication device via at least one of an antenna, a network interface, a modem, or a transmitter. If the wireless communication device is not one of the identified wireless communication devices, the method 800 may end.

The transmission may be preceded by generation of the acknowledgment. The generation of the acknowledgment may be performed by a processor. To generate the acknowledgment, the device may receive data via a receiver and determine whether the data was properly received by decoding the data using a processor or a decoder. In another embodiment, to generate the acknowledgment, the device may determine that it has not received data.

The acknowledgment may include an ACK signal. The acknowledgment may be either a positive acknowledgment indicating that the data was correctly received or a negative acknowledgment indicating that the data was not correctly received. The acknowledgment may be a block ACK signal. The acknowledgment may include a plurality of acknowledgment subunits, each indicating whether a respective data subunit was correctly received.

Figure 8:
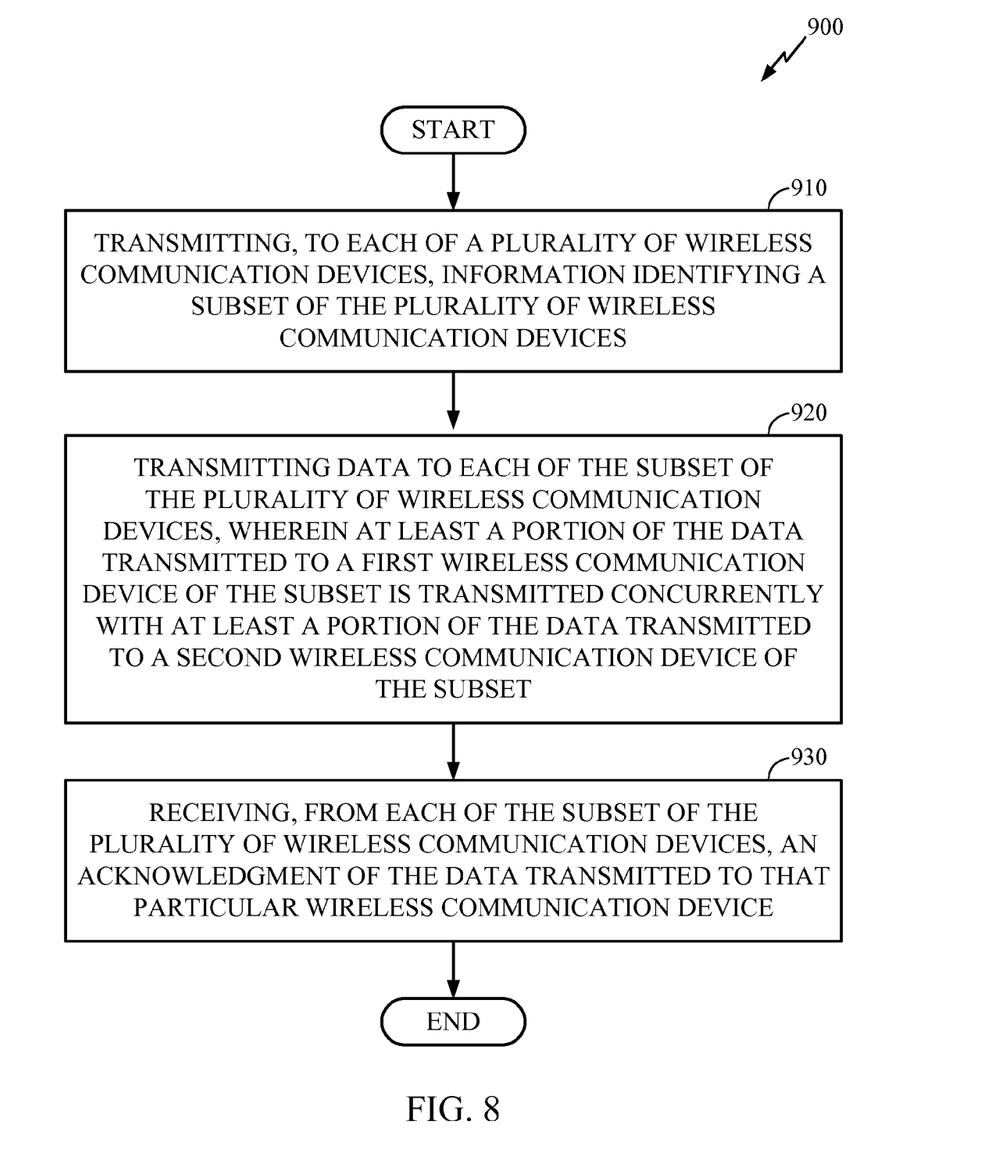
FIG. 8 illustrates an aspect of a method for receiving acknowledgments from multiple wireless devices in a wireless network.

FIG. 8 illustrates an aspect of a method for receiving acknowledgments from multiple wireless devices in a wireless network. The method 900 begins in block 910 with the transmission, to each of a plurality of wireless communication devices, information identifying a subset of the plurality of wireless communication devices. The information may be transmitted by a wireless communication device via at least one of an antenna, a network interface, a modem, or a transmitter. The information may be transmitted as part of a PHY header. The information may be broadcast to the multiple wireless devices. The information may be transmitted by an AP. The information may identify a subset of the stations associated with the AP. The information identifying a plurality of wireless communication devices may include a group identifier (Group ID).

The method 900 continues to block 920 with the transmission of data to each of the subset of the plurality of wireless communication devices. In one embodiment, at least a portion of the data transmitted to a first wireless communication device of the subset is transmitted concurrently with at least a portion of the data transmitted to a second wireless communication device of the subset. The data may be transmitted a wireless communication device via at least one of an antenna, a network interface, a modem, or a transmitter. The data transmitted to any particular wireless communication device may be beamformed or otherwise spatially directed to that particular wireless communication device.

The method 900 continues to block 930 with the reception, from each of the subset of the plurality of wireless communication devices, an acknowledgment of the data transmitted to that particular wireless communication device. The information may be transmitted by a wireless communication device via at least one of an antenna, a network interface, a modem, or a receiver. The acknowledgments may include an ACK signal. The acknowledgments may be includes either a positive acknowledgment indicating that the data was correctly received or a negative acknowledgment indicating that the data was not correctly received. The acknowledgments may include a block ACK signal. The acknowledgments may include an acknowledgment including a plurality of acknowledgment subunits, each indicating whether a respective data subunit was correctly received.

The acknowledgements from each of the subset of the plurality of wireless communication devices may be received sequentially without temporal gaps or with minimal temporal gaps between the acknowledgments. The method 900 may further include selectively retransmitting data to the subset of the wireless communication devices based on the received acknowledgments. In particular, the method 900 may include retransmitting data to stations which indicate (in their acknowledgments) that a data transmission or portions of a data transmission were not properly received.

The method 900 may include determining which station or stations data should be retransmitted to based on a time the acknowledgment or acknowledgments were received, the subset of the stations identified, and an order of those stations.

Figure 9:
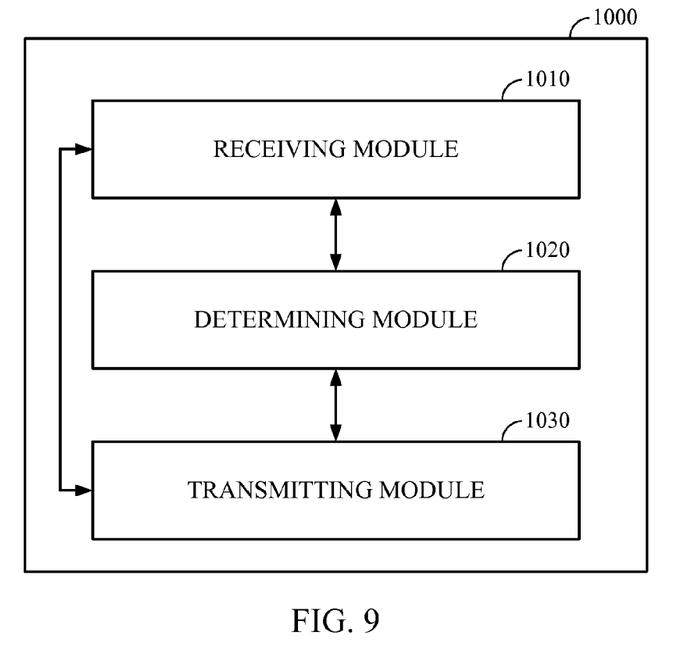
FIG. 9 is a functional block diagram of another exemplary wireless device that may be employed within the wireless communication system of FIG. 1.

FIG. 9 is a functional block diagram of another exemplary wireless device that may be employed within the wireless communication system 100. The device 1000 comprises a receiving module 1010 for receiving information identifying a plurality of wireless communication devices. The receiving module 1010 may be configured to perform one or more of the functions discussed above with respect to block 810 illustrated in FIG. 7. The receiving module 1010 may correspond to the receiver 212. The device 1000 further comprises a determining module 1020 for determining that a particular wireless communication device is one of the identified wireless communication devices. The determining module 1020 may be configured to perform one or more of the functions discussed above with respect to block 820 illustrated in FIG. 7. The determining module 1020 may correspond to the processor 204. The device 1000 further comprises a transmitting module 1030 for transmitting an acknowledgment. The transmitting module 1030 may be configured to perform one or more of the functions discussed above with respect to block 830 illustrated in FIG. 7. The transmitting module 1030 may correspond to the transmitter 210.

Figure 10:
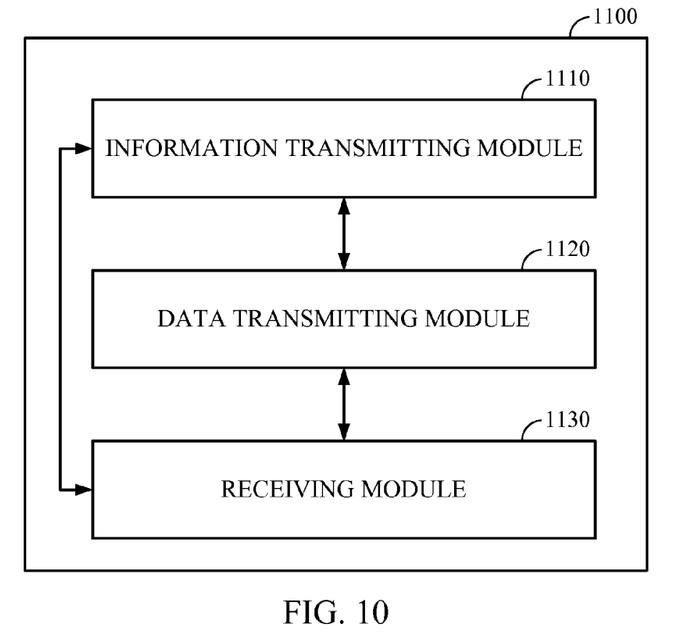
FIG. 10 is a functional block diagram of another exemplary wireless device that may be employed within the wireless communication system of FIG. 1.

FIG. 10 is a functional block diagram of another exemplary wireless device that may be employed within the wireless communication system 100. The device 1100 comprises an information transmitting module 1110 for transmitting information identifying a plurality of wireless communication devices. The transmitting module 1110 may be configured to perform one or more of the functions discussed above with respect to block 910 illustrated in FIG. 8. The transmitting module 1110 may correspond to the transmitter 210. The device 1100 further comprises a data transmitting module 1120 for transmitting data. The transmitting module 1120 may be configured to perform one or more of the functions discussed above with respect to block 920 illustrated in FIG. 8. The transmitting module 1120 may correspond to the transmitter 210. The device 1100 further comprises a receiving module 1130 for acknowledgments. The receiving module 1130 may be configured to perform one or more of the functions discussed above with respect to block 930 illustrated in FIG. 8. The receiving module 1130 may correspond to the receiver 212.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of transmitting an acknowledgment of received data, the method comprising:
receiving, at a device, information having a group identifier, the group identifier identifying a plurality of wireless communication devices;
determining at the device, based on the group identifier, that the device is one of the identified plurality of wireless communication devices;
transmitting, at the device, based on the determining, an acknowledgment that the information was received or a negative acknowledgement that the information was not received; and
receiving data selectively transmitted from an access point based on the transmitted acknowledgment or negative acknowledgment.

2. The method of claim 1, the information further comprising a physical layer header containing the group identifier.

3. The method of claim 1, wherein the information identifying a plurality of wireless communication devices comprises information identifying a subset of wireless communication devices associated with the device.

4. The method of claim 1, wherein the acknowledgment comprises a block acknowledgment.

5. The method of claim 1, wherein the acknowledgment comprises a plurality of acknowledgment subunits.

6. A method of receiving acknowledgment of transmitted data, the method comprising:
transmitting, to each of a plurality of wireless communication devices, information having a group identifier, the group identifier identifying a subset of the plurality of wireless communication devices;
transmitting data to each of the subset of the plurality of wireless communication devices, wherein at least a portion of the data transmitted to a first wireless communication device of the subset is transmitted concurrently with at least a portion of the data transmitted to a second wireless communication device of the subset;
receiving, from each of the subset of the plurality of wireless communication devices, an acknowledgment of the data transmitted to that wireless communication device, based on the group identifier; and
selectively retransmitting data to the subset of the plurality of wireless communication devices based on the received acknowledgments.

7. The method of claim 6, the information identifying a subset of the plurality of wireless communication devices further comprising a physical layer header containing the group identifier.

8. The method of claim 6, wherein the information identifying a subset of the plurality of wireless communication devices comprises information identifying a subset of wireless communication devices associated with a particular wireless communication device.

9. The method of claim 6, wherein transmitting data to each of the subset of the plurality of wireless communication devices comprises simultaneously transmitting data to each of the subset of the plurality of wireless communication devices.

10. The method of claim 6, wherein at least one of the received acknowledgments comprises a block acknowledgment.

11. The method of claim 6, wherein at least one of the received acknowledgments comprises a plurality of acknowledgment subunits.

12. The method of claim 6, wherein at least one of the received acknowledgments indicates whether at least a portion of the data transmitted to that particular wireless communication device was correctly received.

13. An apparatus for transmitting an acknowledgment of received data, the apparatus comprising:

a receiver configured to receive information having a group identifier, the group identifier identifying a plurality of wireless communication devices;

a processor configured to determine at the device, based on the group identifier, that the apparatus is one of the identified plurality of wireless communication devices;

a transmitter configured to transmit, based on the determining, an acknowledgment that the information was received or a negative acknowledgement that the information was not received; and a receiver configured to receive data selectively transmitted from an access point based on the transmitted acknowledgment or negative acknowledgment.

14. The apparatus of claim 13, the information identifying a plurality of wireless communication devices further comprising a physical layer header containing the group identifier.

15. The apparatus of claim 13, wherein the information identifying a plurality of wireless communication devices comprises information identifying a subset of wireless communication devices associated with the apparatus.

16. The apparatus of claim 13, wherein the transmitted acknowledgment comprises a block acknowledgment.

17. The apparatus of claim 13, wherein the transmitted acknowledgment comprises an acknowledgment comprising a plurality of acknowledgment subunits.

18. An apparatus for receiving acknowledgment of transmitted data, the apparatus comprising:

a transmitter configured to transmit, to each of a plurality of wireless communication devices, information having a group identifier, the group identifier identifying a subset of the plurality of wireless communication devices and to transmit data to each of the subset of the plurality of wireless communication devices, wherein at least a portion of the data transmitted to a first wireless communication device of the subset is transmitted concurrently with at least a portion of the data transmitted to a second wireless communication device of the subset; and a receiver configured to receive, from each of the subset of the plurality of wireless communication devices, an acknowledgment of the data transmitted to that wireless communication device, based on the group identifier, wherein the transmitter is further configured to selectively retransmit data to the subset of the plurality of wireless communication devices based on the received acknowledgments.

19. The apparatus of claim 18, the information identifying a subset of the plurality of wireless communication devices further comprising a physical layer header containing the group identifier.

20. The apparatus of claim 18, wherein the information identifying a subset of the plurality of wireless communication devices comprises information identifying a subset of wireless communication devices associated with a particular wireless communication device.

21. The apparatus of claim 18, wherein the transmitter is configured to simultaneously transmit data to each of the subset of the plurality of wireless communication devices.

22. The apparatus of claim 18, wherein at least one of the received acknowledgments comprises a block acknowledgment.

23. The apparatus of claim 18, wherein at least one of the received acknowledgments comprises a plurality of acknowledgment subunits.

24. The apparatus of claim 18, wherein at least one of the received acknowledgments indicates whether at least a portion of the data transmitted to that particular wireless communication device was correctly received.

25. An apparatus for transmitting an acknowledgment of received data, the apparatus comprising:

means for receiving information having a group identifier, the group identifier identifying a plurality of wireless communication devices;

means for determining at the device, based on the group identifier, that the apparatus is one of the identified plurality of wireless communication devices; and means for transmitting, based on the determining, an acknowledgment that the information was received or a negative acknowledgement that the information was not received, wherein the receiving means is further configured to receive data selectively transmitted from an access point based on the transmitted acknowledgment or negative acknowledgment.

26. The apparatus of claim 25, the information identifying a plurality of wireless communication devices further comprising a physical layer header containing the group identifier.

27. The apparatus of claim 25, wherein the information identifying a plurality of wireless communication devices comprises information identifying a subset of wireless communication devices associated with the apparatus.

28. The apparatus of claim 25, wherein the acknowledgment comprises a block acknowledgment.

29. The apparatus of claim 25, wherein the acknowledgment comprises a plurality of acknowledgment subunits.

30. An apparatus for receiving acknowledgment of transmitted data, the apparatus comprising:

means for transmitting, to each of a plurality of wireless communication devices, information having a group identifier, the group identifier identifying a subset of the plurality of wireless communication devices;

means for transmitting data to each of the subset of the plurality of wireless communication devices, wherein at least a portion of the data transmitted to a first wireless communication device of the subset is transmitted concurrently with at least a portion of the data transmitted to a second wireless communication device of the subset;

means for receiving, from each of the subset of the plurality of wireless communication devices, an acknowledgment of the data transmitted to that wireless communication device, based on the group identifier; and means for selectively retransmitting data to the subset of the plurality of wireless communication devices based on the received acknowledgments.

31. The apparatus of claim 30, the information identifying a subset of the plurality of wireless communication devices further comprising a physical layer header containing the group identifier.

32. The apparatus of claim 30, wherein the information identifying a subset of the plurality of wireless communication devices comprises information identifying a subset of wireless communication devices associated with a particular wireless communication device.

33. The apparatus of claim 30, wherein the means for transmitting data to each of the subset of the plurality of wireless communication devices comprises means for simultaneously transmitting data to each of the subset of the plurality of wireless communication devices.

34. The apparatus of claim 30, wherein at least one of the received acknowledgments comprises a block acknowledgment.

35. The apparatus of claim 30, wherein at least one of the received acknowledgments comprises a plurality of acknowledgment subunits.

36. The apparatus of claim 30, wherein at least one of the received acknowledgments indicates whether at least a portion of the data transmitted to that particular wireless communication device was correctly received.

37. A non-transitory computer readable medium comprising instructions that when executed cause an apparatus to:
receive information having a group identifier, the group identifier identifying a plurality of wireless communication devices;
determine at the device, based on the group identifier, that the apparatus is one of the identified plurality of wireless communication devices; and
transmit, based on the determining, an acknowledgment that the information was received or a negative acknowledgement that the information was not received; and
receive data selectively transmitted from an access point based on the transmitted acknowledgment or negative acknowledgment.

38. The non-transitory computer readable medium of claim 37, the information identifying a plurality of wireless communication devices further comprising a physical layer header containing the group identifier.

39. The non-transitory computer readable medium of claim 37, wherein the information identifying a plurality of wireless communication devices comprises information identifying a subset of wireless communication devices associated with the apparatus.

40. The non-transitory computer readable medium of claim 37, wherein the transmitted acknowledgment comprises a block acknowledgment.

41. The non-transitory computer readable medium of claim 37, wherein the transmitted acknowledgment comprises a plurality of acknowledgment subunits.

42. A non-transitory computer readable medium comprising instructions that when executed cause an apparatus to:
transmit, to each of a plurality of wireless communication devices, information having a group identifier, the group identifier identifying a subset of the plurality of wireless communication devices;
transmit data to each of the subset of the plurality of wireless communication devices, wherein at least a portion of the data transmitted to a first wireless communication device of the subset is transmitted concurrently with at least a portion of the data transmitted to a second wireless communication device of the subset;
receive, from each of the subset of the plurality of wireless communication devices, an acknowledgment of the data transmitted to that wireless communication device, based on the group identifier; and
selectively retransmit data to the subset of the plurality of wireless communication devices based on the received acknowledgments.

43. The non-transitory computer readable medium of claim 42, the information identifying a subset of the plurality of wireless communication devices further comprising a physical layer header containing the group identifier.

44. The non-transitory computer readable medium of claim 42, wherein the information identifying a subset of the plurality of wireless communication devices comprises information identifying a subset of wireless communication devices associated with a particular wireless communication device.

45. The non-transitory computer readable medium of claim 42, wherein the transmitted data is simultaneously transmitted to each of the subset of the plurality of wireless communication devices.

46. The non-transitory computer readable medium of claim 42, wherein at least one of the received acknowledgments comprises a block acknowledgment.

47. The non-transitory computer readable medium of claim 42, wherein at least one the received acknowledgments comprises a plurality of acknowledgment subunits.

48. The non-transitory computer readable medium of claim 42, wherein at least one of the received acknowledgments indicates whether at least a portion of the data transmitted to that particular wireless communication device was correctly received.

* * * * *